Jan. 5, 1965   J. R. A. BEALE ETAL   3,164,501
METHOD OF DIFFUSING BORON INTO SEMI-CONDUCTOR BODIES
Filed Feb. 16, 1962

INVENTOR
J. R. A. BEALE
H. E. BROCKMAN
P. E. KREBS
BY
AGENT

United States Patent Office 3,164,501
Patented Jan. 5, 1965

3,164,501
METHOD OF DIFFUSING BORON INTO SEMI-CONDUCTOR BODIES
Julian Robert Anthony Beale, Reigate, Henry Edward Brockman, Horley, and Peter Eric Krebs, Purley, England, assignors to North American Philips Company, Inc., New York, N.Y., a corporation of Delaware
Filed Feb. 16, 1962, Ser. No. 173,669
Claims priority, application Great Britain Feb. 20, 1961
11 Claims. (Cl. 148—189)

The present invention relates to semi-conductor bodies having boron diffused therein and to methods of diffusing boron into semi-conductor bodies.

It has proved difficult to diffuse boron into semi-conductor bodies in a manner which is sufficiently well reproducible and the present invention has inter alia for an object to overcome this problem.

According to the present invention, in a method of diffusing boron into a semi-conductor body, a current of inert gas having a predetermined water vapour or oxygen addition is passed over a boron supply which is heated so that boron is taken by the current from the supply, and the resultant boron-containing current is passed over the body which is heated so that boron diffuses into the body. The boron supply may contain elementary boron, boron nitride and/or a metal boride.

The boron supply may be oxygen free, the material of the supply having previously been heated to drive off the more volatile oxide which is normally present in the commercially-available pure material.

To produce the current of inert gas having a predetermined water vapour addition, dry inert gas may be passed through a container maintained at a constant temperature in which is provided a water source. If the amount of water vapour taken up by the dry inert gas is too great, the inert gas issuing from the container may be mixed with a further quantity of dry inert gas before being passed over the boron supply.

In the container, the dry inert gas may be passed through a mixture of water and another liquid, for example, glycerol. As an alternative, in the container, the dry inert gas may be passed through an aqueous salt solution, for example an aqueous solution of potassium hydroxide or sodium hydroxide. As further alternatives, in the container, the dry inert gas may be passed through an aqueous acid solution, for example sulphuric acid, or through a mass of salt crystals containing water of hydration.

The water source should be stable in the conditions of use and should not give rise to the presence of materials in the wet inert gas current which would affect the taking up of boron from the boron supply, the diffusion of boron or the body. The other liquid, in a water source in which the other liquid is mixed with water, may be miscible with water over a wide range of proportions, for example in any proportion. In general, the other liquid should have a partial vapour pressure, at the temperature of operation of the source, which is small compared with that of the water vapour.

A water source consisting of a mixture of diethylene glycol and water, has been found to be very suitable for use, the amount of water vapour in the water-saturated inert gas being such that no dilution of the wet inert gas by admixture with a further quantity of dry inert gas is necessary. For this purpose, the mixture may contain up to 15% by volume of water, for example, up to 5% by volume of water, and a convenient constant temperature at which to saturate the dry inert gas with water vapour to give a water vapour partial pressure of about 0.1 mm. of mercury is 0° C. It is pointed out that di-ethylene glycol with normal conditions of manufacture, storage and use has an absorbed water content. This is, in general, small and with an addition of 1% of water by volume may be neglected for practical purposes. However, with smaller additions of water, the initial water content of the diethylene glycol may be determined and taken into account in order to achieve a high degree of reproducibility.

No subsequent admixture of dry inert gas is necessary if the container contains ice maintained at a temperature below 0° C., for example, at —40° C.

To produce the current of inert gas having a predetermined oxygen content, oxygen may be mixed with the inert gas by injection into a current of inert gas by way of a small aperture determining the rate of flow of the oxygen.

If a boron-containing current is provided with the aid of a boron-oxide containing source, the boron supply will normally be located at a position remote from the semi-conductor body since it has to be heated at a temperature different from that to which the body is heated. In a silica oven system it is found that reaction may occur between the current and the oven wall. The method according to the present invention makes it possible to heat the boron supply and the body to substantially the same temperature so that the supply and the body may be positioned close to one another so that the effect of reaction with the wall of the oven system is reduced and more reproducible diffusion is obtained.

The inert gas may be nitrogen or argon.

Good results have been obtained for silicon bodies, and another semi-conductor suitable for use is germanium.

Factors affecting the amount of boron diffused into the body are the oxygen or water vapour content and rate of flow of the inert gas, the temperature to which the boron supply is heated and the time for which, and temperature at which, the body is heated in the boron-containing gas current. It is pointed out that the dependency on rate of flow of the inert gas is not linear and if the rate is increased above a certain value the rate of diffusion decreases since the times available for reaction of the current at the boron supply and at the body are reduced.

Although the present invention is not limited to the following supposition, it is thought that the oxygen or water in the current of inert gas operates on the exposed surface area of the boron supply to form boric oxide and/or possibly some more complex oxide and/or hydroxide which volatilizes more readily than metallic boron so that the current becomes boron-containing and that the amount of oxygen or water vapour available in the current controls the rate of formation of the more readily volatile boron-containing material at the exposed surface. It is found that for low concentrations of the oxygen or water vapour, the amount of boron diffused into the body increases with increase in the oxygen or water vapour concentration and with increase in the exposed surface area of the boron supply. It is preferred in order to enhance the degree of reproducibility, to saturate the gas current with boron. In general, therefore, it is preferred for the boron supply to expose a large surface area and to provide control of the boron contained in the atmosphere at the semi-conductor body by controlling the content of oxygen or water vapour in the inert gas current.

If the boron supply is oxygen free, it is found that it is possible to obtain more reproducible results and more exact control of the diffusion.

Embodiments of the method according to the present invention will now be described, by way of example, with reference to the diagrammatic drawing accompanying the provisional specification, in which.

Figure 1:
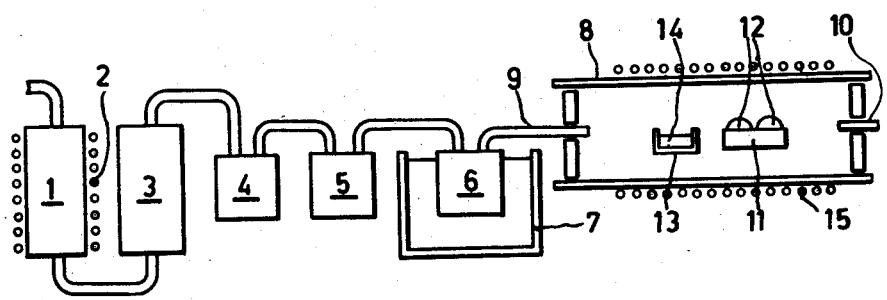
FIGURE 1 shows an apparatus in which the method according to the present invention may be carried out.

Referring now to FIGURE 1, dry pure nitrogen is provided by passage of commercially available nitrogen through a chamber 1 containing catalyst 29/1 available commercially from Imperial Chemical Industries Limited operated at about 170° C. and heated with the aid of a resistive winding 2, a chamber 3 containing activated alumina, a chamber 4 containing glass wool to remove solid particles entrained by passage of the gas through chambers 1 and 3, and a liquid air trap 5.

The catalyst 29/1 is well known commercially, contains about 66% of zinc oxide and 31% copper oxide together with small amounts of other materials and has for its purpose to reduce to water any oxygen in the nitrogen. Activated alumina is also well known, is a porous form of alumina containing a cobalt indicator which changes colour when wet, and has for its purpose to absorb the water content of the nitrogen. The oxygen and water vapour is thus extracted from the nitrogen so that the oxygen and water vapour content of the nitrogen issuing from the liquid air trap 5 is substantially zero.

The nitrogen from the outlet of the liquid air trap is bubbled through a chamber 6 containing a mixture of di-ethylene glycol of Analar purity and water, 1% by volume of deionised water having been added to the glycol. The chamber 6 has a jacket 7 containing water and ice so that the chamber 6 and its contents are maintained at a temperature of 0° C.

The nitrogen issuing from the chamber 6 has a controlled, low water vapour content, which is dependent on the temperature and water content of the liquid in the chamber 6 and which is substantially constant at constant temperature.

The nitrogen and water vapour from the chamber 6 are supplied to a silica furnace chamber 8 having a gas inlet 9 and a gas outlet 10. Within the chamber 8 is provided a holder 11 of silica containing roughly circular slices 12 of 2 cms. diameter and $200/\mu$ thick of n-type silicon having a resistivity of 1 ohm-cm., and a silica container 13 containing a supply of boron 14. A heater winding 15 is provided outside the chamber 8.

The boron may be commercially-available pure boron or may be obtained from commercially available pure boron, which in practice contains a certain amount of boric oxide, by pre-heating to drive off the more volatile oxide. It is found that the use of the pre-heated boron, in general, enhances the reproducibility of the diffusion method.

Pre-heating may conveniently be effected in an atmosphere of pure nitrogen for 1 hour at 1200° C. The temperature is not critical and the time depends on the temperature. At low temperatures, for example at 700° C., the time would be too long for commercial purposes. Heating could even be effected at temperatures above 2000° C., if desired. If the boron supply is of boron nitride or metal boride a similar heat treatment may be used.

In operation, the nitrogen gas current is established at about 0.5 litre/min. and the heater winding 15, which is of the resistive type, is switched on to heat the container 13 and its contents 14 and the slices 12 to a temperature of about 1,200° C.

With the conditions otherwise as described above and using a circular container 13 of 0.5 sq. cm. area, the average concentration of a diffused surface zone of thickness about $6/\mu$ after a heating treatment of two hours was substantially constant ($\pm 20\%$) at about $6 \times 10^{18}$ atoms of boron per cc. and with a container 13 of 1 sq. cm. area and with 4% by volume of water added to the di-ethylene glycol, at about $4 \times 10^{19}$ atoms of boron per cc.

Figure 2:
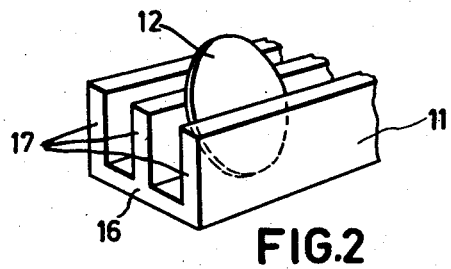
FIGURE 2 is a perspective view of a holder for semiconductor slices for use in carrying out the method.

FIGURE 2 is a perspective view of one form of holder 11 having a base 16 and upstanding walls 17 between which slices are arranged as shown for one slice 12 so that the boron-containing current has direct access to substantially the entire surface of each slice.

Figure 3:
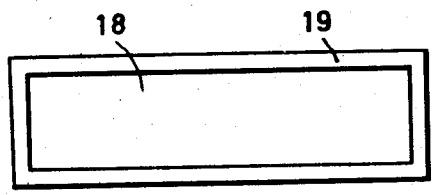
FIGURE 3 is a cross-sectional view of a slice of semiconductor when treated by the method according to the present invention.

FIGURE 3 is a cross-section of a single slice, after the completion of a diffusion treatment, having an inner n-type conductivity part 18 and a surface boron-containing, diffused layer 19 of p-type conductivity.

The slice shown in FIGURE 3 may thereafter be further treated in any known manner to provide semi-conductor devices, the improved reproducibility of the boron-diffusion process making it possible to provide more reproducible devices.

For the sake of completeness, it is mentioned that the partial vapour pressure of water vapour in the nitrogen using di-ethylene glycol to which 1% by volume of water has been added, at 0° C. is about .1 mm. of mercury and using di-ethylene glycol to which 4% by volume of water has been added, at 0° C. is about .85 mm. of mercury.

The average concentrations of boron in the diffused surface zones are measured by determining the sheet resistances of the diffused layer and interpreting the results with the aid of Backenstoss's curves as reported in Bell System Technical Journal, vol. 37, pages 699 to 710, 1958.

The mixture of di-ethylene glycol and water may be replaced in the chamber 6 by a mixture of glycol and water, an aqueous salt solution, an aqueous acid-gas solution or a mass of salt crystals containing water of hydration and the contents of the jacket 7 replaced to provide a bath maintained at any convenient temperature other than 0° C. Further, instead of boron or oxygen-free boron, the boron supply may be of boron nitride or a metal boride which may also be oxygen free.

If it is desired to mix the wet inert gas provided from the chamber 6 with dry inert gas, the apparatus may be modified so that the gas inlet 9 joins a tube in which is set up a current of dry inert gas and the mixture supplied to the chamber 8.

If oxygen is used instead of water vapour, a similar modification may be made, oxygen being supplied through a tube comprising a small aperture determining the rate of flow of the oxygen and joined to a further tube in which is set up a current of inert gas, the mixture being supplied to the chamber 8.

What is claimed is:

1. A method of diffusing boron into a semiconductive body, comprising providing in a container a solid supply of a substantially oxygen-free solid, substantially involatile substance selected from the group consisting of elemental boron and boron compounds reactable with one of water vapor and oxygen to produce a volatile boron oxide, flowing over said supply an inert gas containing a selected amount of an oxidant selected from the group consisting of water vapor and oxygen, heating said supply while the said gas is flowed over at a temperature at which the oxidant causes oxidation of the supply and the production and volatilization of a volatile oxidized boron compound, passing the same inert gas now containing the oxidized boron compound over the semiconductive body, and heating the body while the oxidized boron compound containing inert gas is flowing over to cause boron to diffuse into the body and establish a boron concentration therein dependent upon the said amount of the oxidant initially provided in the inert gas.

2. A method as set forth in claim 1 wherein the supply and the body are heated to substantially the same temperature.

3. A method of diffusing boron into a semiconductive body, comprising providing a container with a source of water, passing a dry inert gas through the container while the latter is maintained at a preselected constant temperature to introduce into the gas an amount of water vapor determined by the container temperature, providing a supply of an oxygen-free, solid, substantially involatile substance selected from the group consisting of elemental boron, boron nitride and metal borides, flowing over said supply said inert gas containing said selected amount of water vapor, heating said supply at a temperature at which the water vapor causes oxidation of the supply and the production and volatilization of a volatile oxidized boron compound, passing the same inert gas now containing the oxidized boron compound over the semiconductive body, and heating the body at the same temperature as said supply while the oxidized boron compound containing inert gas is flowing over to cause boron to diffuse into the body and establish a concentration therein dependent upon the said selected amount of the water vapor initially established in the inert gas.

4. A method as set forth in claim 3 wherein the inert gas issuing from the container is mixed with a further quantity of dry inert gas before being passed over the said supply.

5. A method as set forth in claim 3 wherein the water source is selected from the group consisting of an aqueous salt solution, an aqueous acid solution, and salt crystals containing water of hydration.

6. A method of diffusion boron into a semiconductive body, comprising providing a container with a source of water comprising a mixture of water and another liquid, passing a dry inert gas through the container while the latter is maintained at a preselected constant temperature to introduce into the gas an amount of water vapor determined by the container temperature, providing a supply of an oxygen-free, solid, substantially involatile substance selected from the group consisting of elemental boron, boron nitride and metal borides, flowing over said supply said inert gas containing said selected amount of water vapor, heating said supply at a temperature at which the water vapor causes oxidation of the supply and the production and volatilization of a volatile oxidized boron compound, passing the same inert gas now containing the oxidized boron compound over the semiconductive body, and heating the body while the oxidized boron compound containing inert gas is flowing over to cause boron to diffuse into the body and establish a concentration therein dependent upon the said selected amount of the water vapor initially established in the inert gas, said supply and said body being heated in the same furnace at substantially the same temperature.

7. A method as set forth in claim 6 wherein the said other liquid is selected from the group consisting of glycerol and di-ethylene glycol.

8. A method as set forth in claim 6 wherein the mixture contains up to 15% by volume of water.

9. A method as set forth in claim 6 wherein the preselected constant temperature is not greater than 0° C.

10. A method as set forth in claim 6 wherein the inert gas is nitrogen, and the body is of silicon.

11. A method of diffusing boron into a semiconductive body, comprising providing a supply of an oxygen-free and substantially involatile, solid substance selected from the group consisting of elemental boron and boron compounds reactable with oxygen to produce a volatile boron oxide, flowing over said supply an inert gas containing a selected amount of injected oxygen, heating said supply at a temperature at which the oxygen causes oxidation of the supply and the production and volatilization of a volatile boron oxide, passing the same inert gas now containing boron oxide over the semiconductive body, and heating the body while the boron-oxide-containing inert gas is flowing over to cause boron to diffuse into the body and establish a concentration therein dependent upon the said predetermined amount of the oxygen initially provided in the inert gas.

References Cited in the file of this patent

UNITED STATES PATENTS

| 2,802,760 | Derick et al. | Aug. 13, 1957 |
| 2,804,405 | Derick et al. | Aug. 27, 1957 |
| 2,873,222 | Derick et al. | Feb. 10, 1959 |
| 2,879,190 | Logan | Mar. 24, 1959 |

OTHER REFERENCES

Zintl et al.: "Bormonoxyd," Z. Anorg. Chemie, Band 245, pp. 8 to 11, 1940.